US005987442A

United States Patent [19]
Lewis et al.

[11] Patent Number: 5,987,442
[45] Date of Patent: Nov. 16, 1999

[54] METHOD AND APPARATUS FOR LEARNING NETWORK BEHAVIOR TRENDS AND PREDICTING FUTURE BEHAVIOR OF COMMUNICATIONS NETWORKS

[75] Inventors: Lundy Lewis, Mason; Utpal Datta, Bedford, both of N.H.

[73] Assignee: Cabeltron Systems, Inc., Rochester, N.H.

[21] Appl. No.: 08/960,076

[22] Filed: Oct. 24, 1997

Related U.S. Application Data

[63] Continuation of application No. 08/382,666, Feb. 2, 1995, abandoned.

[51] Int. Cl.⁶ .................................................. G06F 15/18
[52] U.S. Cl. .............................................. 706/10; 395/500
[58] Field of Search ................................ 706/15, 16, 25, 706/10, 20; 364/488; 395/500

[56] References Cited

U.S. PATENT DOCUMENTS

| | | | |
|---|---|---|---|
| 4,727,548 | 2/1988 | Dickey | 371/49.4 |
| 5,166,927 | 11/1992 | Iida et al. | 370/50 |
| 5,197,127 | 3/1993 | Waclawsky et al. | 395/200 |
| 5,251,285 | 10/1993 | Inoue et al. | 706/10 |
| 5,307,444 | 4/1994 | Tsuboka | 706/20 |
| 5,377,196 | 12/1994 | Godlew et al. | 395/20.1 |
| 5,388,189 | 2/1995 | Kung | 395/50 |
| 5,446,874 | 8/1995 | Waclawsky et al. | 395/575 |
| 5,452,215 | 9/1995 | Washabaugh | 364/468.04 |
| 5,469,553 | 11/1995 | Patrick | 395/750.05 |
| 5,490,266 | 2/1996 | Sturges | 395/500 |

FOREIGN PATENT DOCUMENTS 0 412 692 A1  2/1991  European Pat. Off. ......... H04M 3/36

OTHER PUBLICATIONS

Lin et al., "Induction and Deduction For Autonomous Networks," IEEE Journal on Selected Areas In Communications, vol. 11, No. 9, Dec. 1993, New York, NY, pp. 1415–1425.

Jander, "Dynamic Duo Does Monitoring: Concord's Software Makes The Most Of SNMP Data In Hubs And Probes," Data Communications, vol. 23, No. 16, Nov. 1994, New York, NY, pp. 47–48.

Matsuda et al., "Traffic Administration Based On Daily Traffic Forecast," NTT Review, vol. 4, No. 4, Jul. 1992, Tokyo, Japan, pp. 69–74.

Carr, "Low–Cost Network Monitor Gets The LAN Lowdown: HP Software Presents Data On Erors And Usage Patterns In Graphical Form," Data Communications, vol. 21, No. 6, Apr. 1992, New York, NY, pp. 43–44.

*Primary Examiner*—Paul R. Lintz
*Assistant Examiner*—Sanjiv Shah
*Attorney, Agent, or Firm*—Wolf, Greenfield & Sacks

[57] ABSTRACT

Apparatus and method for learning current network behavior and predicting future behavior which utilizes a state transition graph. The graph includes nodes which represent network states, and arcs which represent trends in observable network parameters that result in a transition from a current state to another state. For example, a watch service may be instituted on multiple ports of a router, and the observed network traffic on the ports over time may be transformed into a state transition graph that represents network behavior. The network states may be labeled such as "good", or "bad", etc., according to a predetermined performance criteria. Once a state transition graph is constructed, the system may then monitor the current state and current trends of the network parameters in order to predict and display future network states. The system may include an automatic warning signal for alerting a user that the network is headed in the direction of a problematic state. The prediction of future network behavior may be made from the state transition graph, the current state of the network, and the current network trends.

30 Claims, 7 Drawing Sheets

| Time | P1 | P2 | P3 | P4 | P5 | P6 | P7 | P8 | P9 | P10 | P11 | P12 |
|---|---|---|---|---|---|---|---|---|---|---|---|---|
| 68 | 10.48 | 2.14 | 1.52 | 19.92 | 2.28 | 0.37 | 2.57 | 2.90 | 3.56 | 4.72 | 3.40 | 10.15 |
| 69 | 9.77 | 2.05 | 2.10 | 15.38 | 2.15 | 0.19 | 1.19 | 4.19 | 3.34 | 6.39 | 4.61 | 14.61 |
| 70 | 8.83 | 2.67 | 2.05 | 8.34 | 4.11 | 0.21 | 1.12 | 2.23 | 4.53 | 3.91 | 5.59 | 13.33 |
| 71 | 8.73 | 2.02 | 1.30 | 8.07 | 4.63 | 0.19 | 1.15 | 1.88 | 0.55 | 4.87 | 6.54 | 15.54 |
| 72 | 5.69 | 4.09 | 1.21 | 7.13 | 4.21 | 0.27 | 2.66 | 2.24 | 1.36 | 6.20 | 4.55 | 11.73 |
| 73 | 6.16 | 5.62 | 2.93 | 14.74 | 4.49 | 0.27 | 1.83 | 3.45 | 0.48 | 5.23 | 6.76 | 13.43 |
| 74 | 7.04 | 6.91 | 3.03 | 16.30 | 2.19 | 0.13 | 0.57 | 1.67 | 0.21 | 6.68 | 5.42 | 20.59 |
| 75 | 5.53 | 2.64 | 0.44 | 5.91 | 3.45 | 0.23 | 1.43 | 2.07 | 0.24 | 4.73 | 3.90 | 13.04 |
| 76 | 12.97 | 0.89 | 0.52 | 4.48 | 2.09 | 0.13 | 2.22 | 6.20 | 0.51 | 6.86 | 0.91 | 2.85 |
| 77 | 4.35 | 1.63 | 1.64 | 6.26 | 2.20 | 0.12 | 2.59 | 1.60 | 0.18 | 2.74 | 0.99 | 2.52 |
| 78 | 11.70 | 1.73 | 0.95 | 4.78 | 1.10 | 0.11 | 0.88 | 3.17 | 0.06 | 2.36 | 6.49 | 14.86 |
| 79 | 7.33 | 1.14 | 1.12 | 4.84 | 2.46 | 0.20 | 2.90 | 1.10 | 0.03 | 3.90 | 4.33 | 10.34 |

FIG. 2

METHOD AND APPARATUS FOR LEARNING NETWORK BEHAVIOR TRENDS AND PREDICTING FUTURE BEHAVIOR OF COMMUNICATIONS NETWORKS

This application is a continuation of application Ser. No. 08/382,666, filed Feb. 2, 1995 now abandoned.

FIELD OF THE INVENTION

The present invention is directed to the monitoring, analysis and prediction of network behavior, and more specifically to an apparatus and method for learning and displaying a current behavioral state and possible transitions to other states and for monitoring current behavior trends in order to predict future states of the network.

BACKGROUND OF THE INVENTION

In the prior art, an averaging/thresholding method has been applied for learning the behavior trends of a network. Basically, this method observes the traffic in a network segment over a period of time, for example a month, in order to determine an average or norm of the behavior over time. For example, the average bandwidth utilization in a network segment backbone may be represented by an interval [x, y], where x is the lower threshold of utilization and y is the upper threshold. During a period of one month, the bandwidth utilization may for instance fall within an interval [25, 40], with only a few stray values falling outside the interval, where 25 is the lower threshold, and 40 is the upper threshold.

Commercial tools that implement the averaging method generally record bandwidth utilization data for some period of time and then use a statistical algorithm to calculate the norm. A current value of bandwidth utilization is then compared with the calculated norm. If the current value is outside the norm, an alarm is issued to warn the network administrator of the discrepancy.

The averaging/thresholding method can be extended to find norms for traffic occurring within multiple network segments, in trunks that connect segments, and between individual nodes in a network. An example of a commercial tool that uses the averaging/thresholding method is the HP Network Advisor, sold by Hewlett Packard Company, 4 Choke Cherry Road, Rockville, Md. 20850.

The averaging/thresholding method is useful for setting watches on network segments and for alerting the network administrator when the current traffic on a particular network segment exceeds a threshold. However, if the network administrator needs to understand the overall behavior patterns of the network, the averaging/thresholding method does not suffice. A method that predicts network behavior would be extremely helpful in providing the administrator more opportunity and time to intervene when the network appears to be moving toward a problematic state. With such a method, the administrator would be able to intervene before the problematic state occurred.

SUMMARY OF THE INVENTION

The present invention is directed to a method and apparatus for learning behavior patterns of a network, for producing a state transition graph to represent the behavior patterns, and for predicting future states that the network may enter from a current state. This allows a network administrator to understand the behavior patterns of the overall network. In addition, by being able to predict future states, it provides the network administrator with more opportunity and time to intervene whenever the network appears to be moving toward a problematic state.

The method of this invention determines a range of possible network states and transitions and displays the same in a state transition graph. The possible states and transitions are derived from a history of network parameters accumulated in the data repository of a network management system. The current network parameters are then read for calculating the current state, current trends and the possible next states. Still further, by characterizing the next network states according to a performance criterion, the present invention can identify problematic states and warn the network administrator. Finally, the present invention displays the derived information about the network behavior to a user.

These and other advantages of the present invention are more particularly described in the following detailed description and drawings.

BRIEF DESCRIPTION OF THE DRAWINGS

FIG. 2 is a table of representative network parameter data accumulated in a data repository of a network management system.

DETAILED DESCRIPTION

Figure 1:
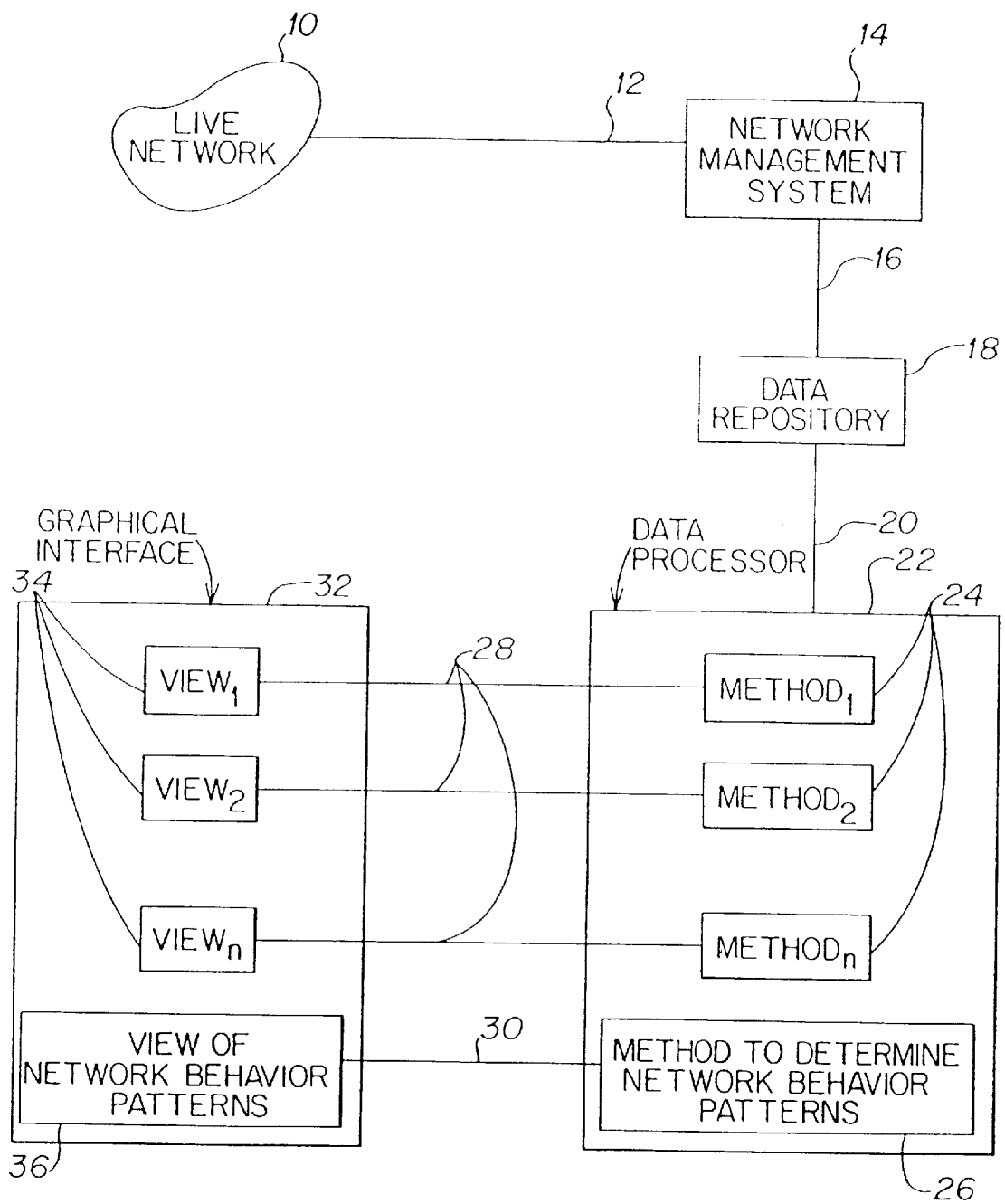
FIG. 1 is a schematic illustration of an apparatus for learning, predicting, and displaying network behavior patterns according to this invention.

FIG. 1 is a block diagram illustrating the method and apparatus of the present invention. A network management system 14 monitors a live network 10 via communication link 12 over a period of time and passes the resulting network parameter data to a data repository 18 via communication link 16. Over a period of time, streams of data (e.g., of the type shown in FIG. 2) accumulate in the data repository 18. Data processor 22 accesses this accumulated data from the data repository 18 via communication link 20.

Figure 3:
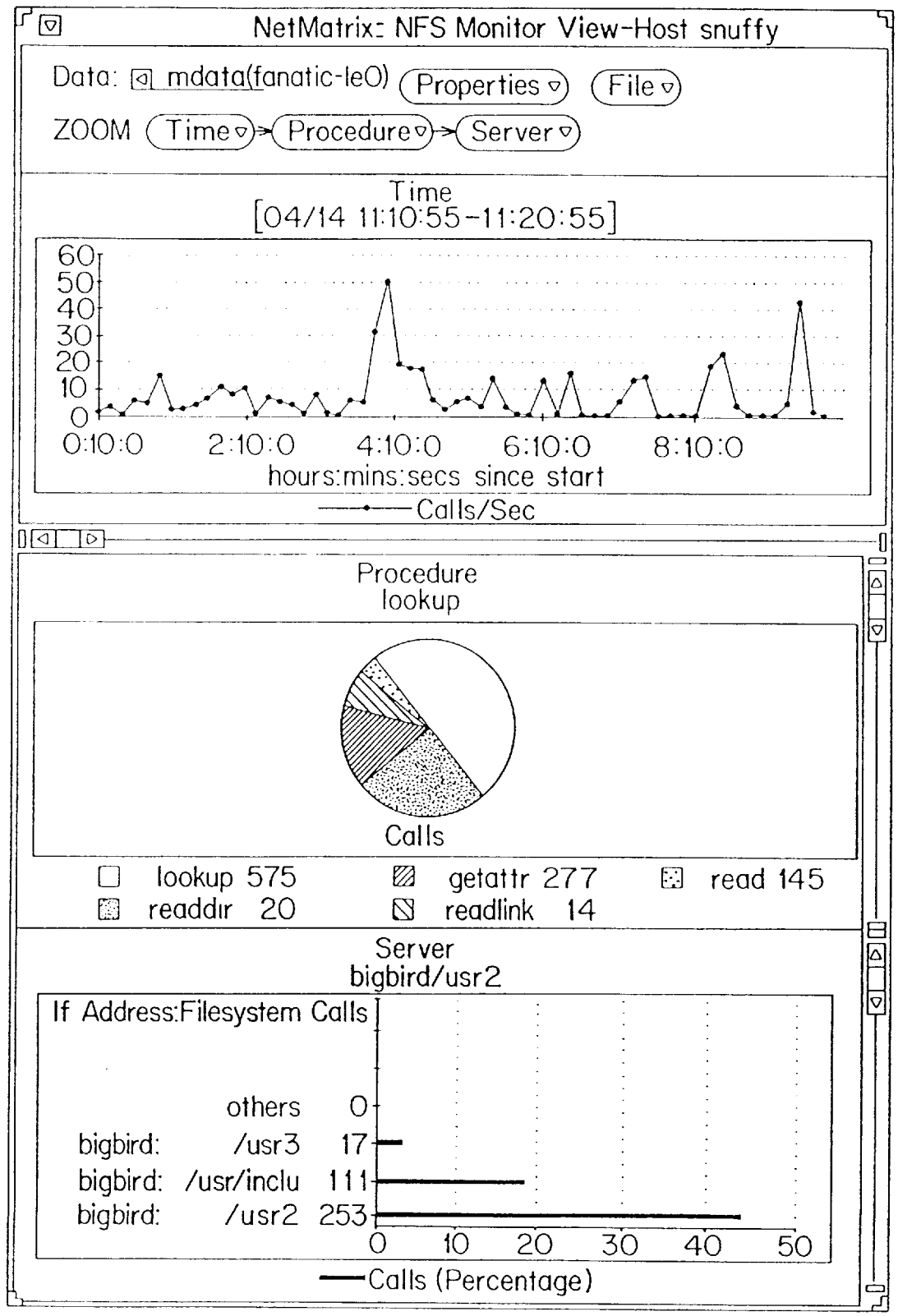
FIG. 3 shows various types of prior art displays for graphically illustrating network parameters.

Within the data processor 22, $method_1$, $method_2$, ..., $method_n$ (collectively labeled 24) refer to existing methods of transforming the data in data repository 18 into $view_1$, $view_2$, ..., $view_n$ (collectively labeled 34) on graphical interface 32, via communication links 28. FIG. 3 shows examples of such prior art views, which may be pie graphs, bar graphs, and two dimensional graphs derived from the network parameters.

The present invention comprises both a new method and a new view, which are shown in FIG. 1 as a "Method to Determine Network Behavior Patterns" 26 (within processor 22) and a "View of Network Behavior Patterns" 36 (within graphical display 32 via communication link 30). The new method solves the following problem: Given a current state of a network and an observation of key network parameters, what will be the next state? In order to solve this problem, we now define: the concept of a network state; examples of observable network parameters; and rules for predicting a transition from one state to another given the values for the network parameters.

Figure 4:
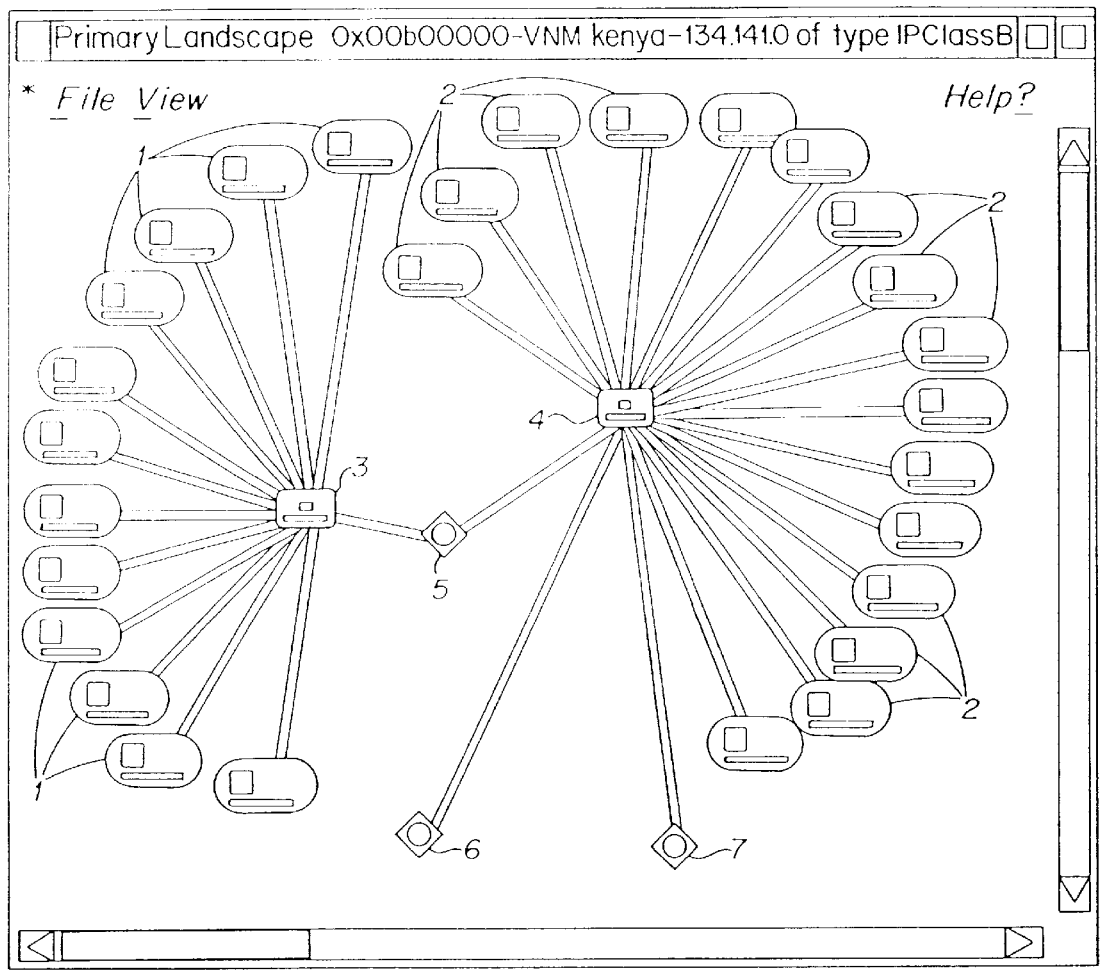
FIG. 4 is a high-level topology view of a sample network containing multiple subnets and routers.

FIG. 4 shows an exemplary high-level topology view of a network containing multiple subnets and routers (as an example of live network 10 in FIG. 1). The group of twelve icons 1 on the left of the figure, and the group of sixteen icons 2 on the right, may be Ethernet subnets. A pair of routers 3, 4 near the center are connected to these two groups of subnets, respectively, and the routers themselves are connected to each other via a coupler 5. Note that other subnets and routers (not shown in FIG. 4) have trunks attached to the network via couplers 6 and 7, which in turn are connected to router 4.

For purposes of illustration, consider the leftmost router 3 in FIG. 4 and its twelve subnet group. Router 3 has twelve ports with traffic flowing to and from the respective twelve subnets. In order to monitor the amount of traffic on the network, watches may be placed on each of the twelve ports. These watches can measure the percentage of port utilization during a predetermined time interval.

The measurements may be recorded in a table, such as that shown in FIG. 2, and stored in the data repository 18. FIG. 2 shows a measured level of traffic on each of twelve ports P1, P2, . . . , and P12, for a few minutes of time. Examples of network management systems (see 14 in FIG. 1) capable of implementing such a watch are: 1) Sniffer, Network General Corporation, 4200 Bohannon Drive, Menlo Park, Calif. 94025; 2) NetMetrix, Hewlett-Packard Corporation, 1 Tara Boulevard, Nashua, N.H. 03062; 3) LANalyzer, Novell, Inc., 122 East 1700 South, Provo, Utah 84606-6194; and 4) Spectrum™ Network Management System, Cabletron Systems, Inc., Rochester, N.H. In addition, the network management system 14 may include network management platforms, network monitors, or basic low-level programs such as "Etherfind" on Sun workstations, or "Netsnoop" on Silicon Graphics IRIX workstations.

Port utilization data measured for one month in the form of FIG. 2 would take up thousands of pages, and would not provide a general description of network behavior. The prior art methods allow transformation of the accumulated data into graphical views such as an x–y plot, pie graph, and bargraph (see FIG. 3.) In addition, the prior art averaging algorithm may be applied to the measured data in order to set alarm thresholds for each port. However, none of these methods allow a network administrator to understand overall patterns in network behavior or to predict network behavior.

Figure 5:
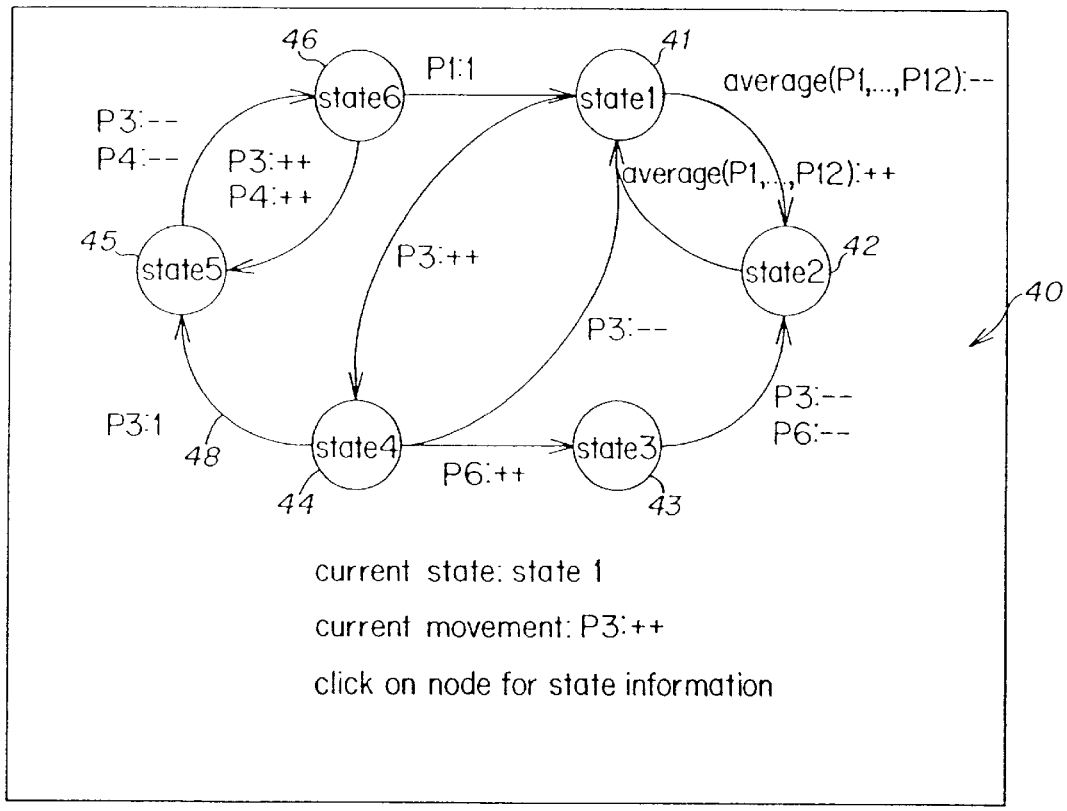
FIG. 5 is an example of a state transition graph generated according to the present invention.

The method of the present invention transforms the numeric data in FIG. 2 into a state transition diagram (a.k.a. a deterministic finite automaton) that represents the overall behavior patterns of the network. FIG. 5 shows an example of such a state transition graph 40, wherein nodes 41–46 represent six possible network states and arcs 48 connecting the nodes represent trends in observable network parameters that result in a transition from one state to another state. The trends are labeled with one or more port numbers (from FIG. 2) each followed by a symbol which indicates how the observed parameter is changing. The states are represented as nodes and embody the twelve parameters (where each parameter represents traffic at one of the twelve ports). The value of each parameter may be an interval [x, y], where x represents a lower bound of port utilization and y represents an upper bound, over a predetermined time period. Accordingly, a network state for the data of FIG. 2 may be represented as follows:

| State S | {P1 = [x1, y1], |
|---|---|
| | P2 = [x2, y2], |
| | P3 = [x3, y3], |
| | P4 = [x4, y4], |
| | P5 = [x5, y5], |
| | P6 = [x6, y6], |
| | P7 = [x7, y7], |
| | P8 = [x8, y8], |
| | P9 = [x9, y9], |
| | P10 = [x10, y10], |
| | P11 = [x11, y11], |
| | P12 = [x12, y12] }. |

The different states and trends are determined based on historic data and any one of the supervised or unsupervised learning methods described hereinafter.

The current numeric values on the ports P1, P2, . . . , P12 are measured in short time increments, for example 10 minutes. A simple process may be used to translate the numeric values into symbolic values. For the state transition graph of FIG. 5, the language of the symbolic values that represent trends in current network parameters is as follows:

| 0  | no traffic; |
|---|---|
| 1  | maximum traffic; |
| –  | moderately decreasinq traffic; |
| –– | quickly decreasing traffic; |
| =  | stable traffic; |
| +  | moderately increasing traffic; and |
| ++ | quickly increasing traffic. |

A prediction of future network behavior is determined from the state transition graph, the current state of the network, and the current network trends. For example, in the state transition graph of FIG. 5, if the network were in state 1 and a measurement of the current network parameters indicates that utilization of port 3 is increasing quickly, the present method would predict that the network will enter state 4. Upon transition to state 4, the network can either make a transition to state 3 or state 5, or return to state 1.

The present method labels the states according to a performance criterion. In FIG. 5, if state 3 were designated a "bad" state, then state 4 would be a potentially problematic state because state 4 could enter the bad state if the utilization on port 6 were to increase quickly. The present method warns the network administrator of potentially problematic states.

Figure 6:
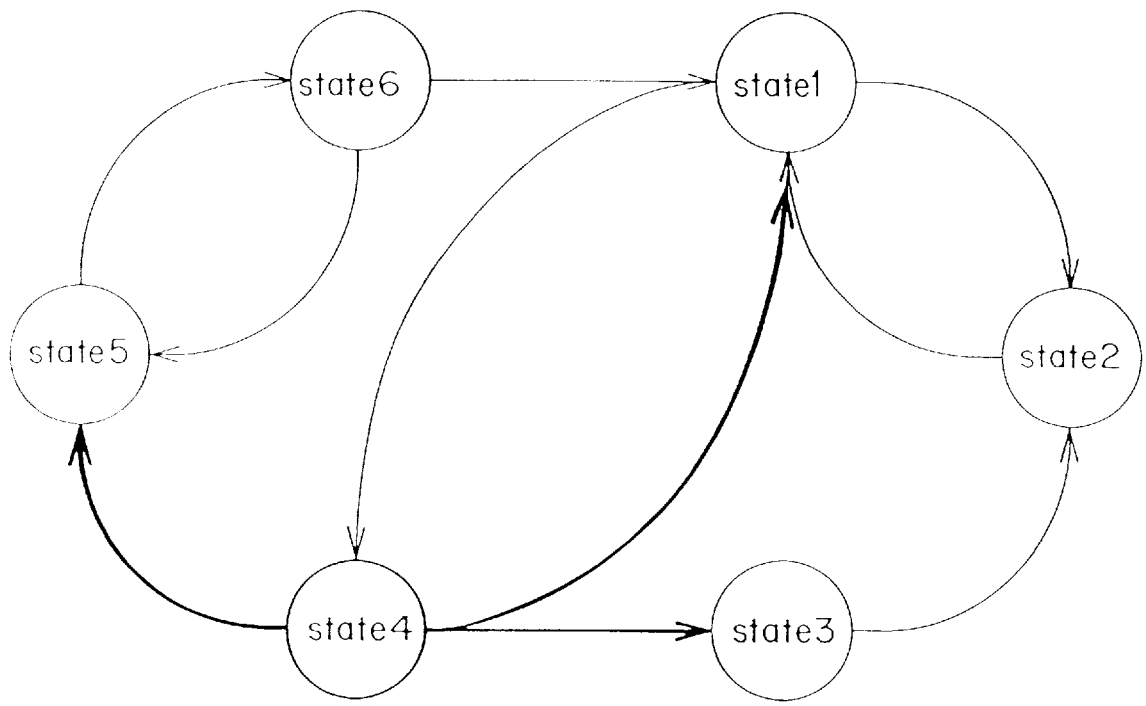
FIG. 6 is a further exemplary display of a state transition graph with the current state and possible transitions from the current state all highlighted in bold.

Finally, the present method may display all of the derived information concerning the network behavior patterns to the user, i.e., the state transition graph, the current state, and the possible future states. For example, FIG. 6 shows an exemplary display of a state transition graph where state 4 is highlighted as the current state. Also, the possible transitions via the arcs from state 4 are highlighted to emphasize the possible next states. In the alternative, the current state and the possible future states may be color coded on the display. In addition, labels corresponding to a predetermined performance criterion may be provided to the user.

The method of this invention has taken a history of network behavior as embodied for example in the data of FIG. 2 and has transformed it into a state transition diagram as in FIG. 5. This transformation is referred to generally as "learning." Several methods of learning exist, but the two main classes of learning being known as "supervised" and "unsupervised."

In supervised learning, labels are applied to the numeric data at each time increment. Labels may depict a performance criterion, and examples of such labels are "good," "bad," "state 1," and "evening state." A supervised learning algorithm generalizes over particular network parameters in order to produce a concept of a "good" state, or a "bad" state, according to the performance criterion.

In unsupervised learning, no labels are applied to the numeric data. This type of learning algorithm discovers and delineates key network states and labels the states with arbitrary names such as "state 1" and "state 2." However, the network administrator may wish to re-label the states with more meaningful names.

Examples of prior art supervised and unsupervised learning methods include the following:

A. Supervised Methods
  (i) Iterative Dichotomizing Third (ID3) Algorithms;
  (ii) Multilayer Perceptrons (a.k.a. neural networks with backpropagation learning); and
  (iii) Recurrent Neural Networks.
B. Unsupervised Methods
  (i) Adaptive Resonance Theory (ART) Networks;
  (ii) Kohonen's Self Organizing Feature Maps; and
  (iii) Clustering Algorithms.

These methods differ with respect to efficiency, correctness, and ease-of-implementation. The present invention is not tied to any particular one of these methods.

The following pseudo-code is for a particular multilayer perceptron learning embodiment that may be implemented in a C++ software program:

| Definitions | |
| --- | --- |
| $u_{1,j}$ | output of the jth node in layer 1 |
| $W_{1,j,i}$ | weight which connects the ith node in layer 1-1 to the jth node in layer 1 |
| $x_p$ | pth training sample |
| $u_{0,i}$ | ith component of the input vector |
| $d_j(x_p)$ | desired response of the jth output node for the pth training sample |
| $N_1$ | number of nodes in layer 1 |
| L | number of layers |
| P | number of training patterns |

| Backpropagation Learning Algorithm |
| --- |
| procedure BACK_PROP |
|   Initialize the weights to small random values; |
|   repeat |
|     Choose next training pair (x,d) and let |
|     the $0^{th}$ layer be $u_0$=x; |
|     FEED_FORWARD; |
|     COMPUTE_GRADIENT; |
|     UPDATE_WEIGHTS; |
|   until termination condition reached; |
| end; {BACK_PROP} |
| subroutine FEED_FORWARD |
|   for layer=1 to L do |
|     for node = 1 to $N_{layer}$ do |
|       $u_{layer,node} = f(\sum_{i=0}^{N_{layer-1}} w_{layer,node,i} u_{layer-1,i})$; |
|     endloop |
|   endloop |
| end; {FEED_FORWARD} |
| subroutine COMPUTE_GRADIENT |
|   for layer = L to 1 do |
|     for node = 1 to $N_{layer}$ do |
|     if layer = L then $e_{L,node} = U_{L,node} - d_{node}$; |
|     else $e_{layer,node} =$ |
|     $N_{layer-1}$ |
|     $\sum_{m=1}$ $e_{layer+1,m} u_{layer+1,m} (1-u_{layer+1,m}) w_{layer+1,m,node}$; |
|     endloop |
|   for all weights in layer layer do |
|     $g_{layer,j,i} = e_{layer,j} u_{layer,j} (1-u_{layer,j}) u_{layer-1,i}$; |
|   endloop |
|   endloop |
| end; {COMPUTE_GRADIENT} |
| subroutine UPDATE_WEIGHTS |
|   for all $w_{1,j,i}$ do |
|     $w_{1,j,i}(k + 1) = w_{1,j,i}(k) - \mu g_{1,j,i}$; |
|   endloop |
| end; {UPDATE_WEIGHTS} |

A summary of the above code will now be provided.

Suppose each line of the network parameters in FIG. 2 were classified into one of ten states, where the states are labelled with numeric values, for example, 1, 2, . . . , 10. (Note that this labelling is what characterizes this pseudo-code as "supervised" learning.) Then, an extra column in FIG. 2 would hold the classification of the lines of data. Each line of data in FIG. 2 may be characterized as a training pair (x,d), where x is a training sample (i.e., the original line) and d is a desired output (i.e., the classification). Given a table of training pairs, the learning algorithm proceeds as follows:

(i) (x,d) of the first line in the table is read;

(ii) the FEED-FORWARD subroutine uses an initial set of random weights w to map the training sample x into an actual output u;

(iii) the COMPUTE_GRADIENT subroutine calculates the difference between the actual output u and the desired output d; and (iv) given this difference, the UPDATE_WEIGHTS subroutine adjusts the set of weights w so that the actual output u becomes closer to the desired output d.

After multiple iterations of this algorithm over the subsequent lines of the training (accumulated) data in FIG. 2, the algorithm learns to classify each line of the training data into the correct state, and also to classify future lines of data into corresponding states. A similar algorithm may be used to learn the transitions or trends from one state to another.

This and other methods are described in the paper, "Progress in Supervised Neural Networks," IEEE Signal Processing Magazine, January 1993, by Don Hush and Bill Horne. Another good summary of these methods is found in the book, *Neural Network Learning,* by Steve Gallant, MIT Press, 1993.

Figure 7:
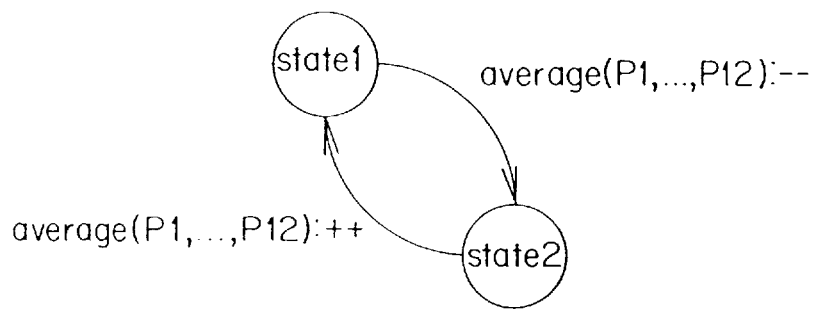
FIG. 7 is a simplified state transition graph with only two states.

FIG. 7 shows yet another alternative embodiment of a simple daytime/nighttime transition diagram, wherein state 1 may represent the daytime state, and state 2 the nighttime state. The present method translates the average of activity on all ports of the network at any time increment into the above-defined symbolic language. Thus, if the network represented in the state transition graph of FIG. 7 is in state 1 and the average is decreasing quickly, the present method would predict that the network will enter the nighttime state.

Figure 8:
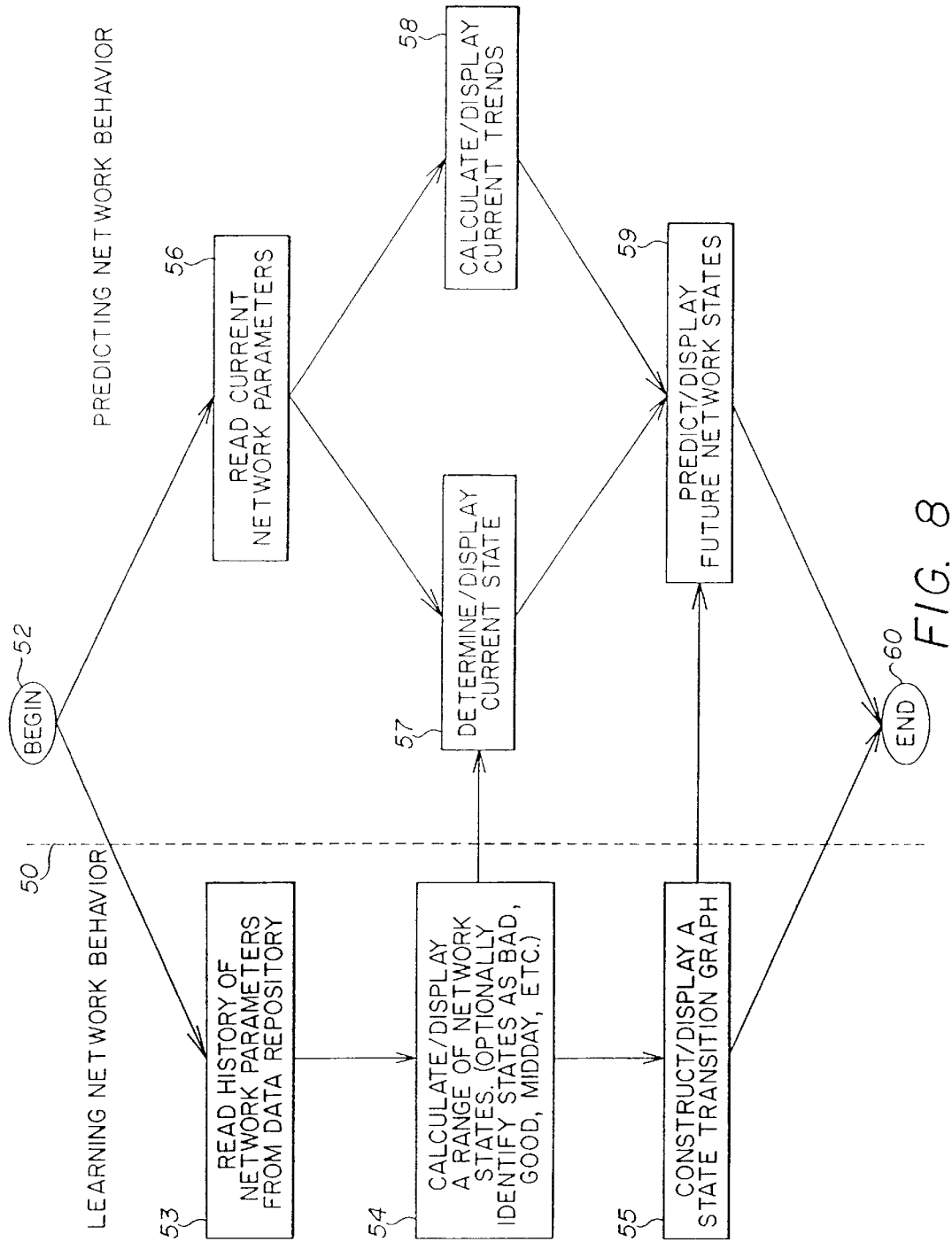
FIG. 8 is a flow diagram illustrating the method steps of the present invention.

FIG. 8 is a flow chart summarizing various aspects of the present invention. To the left of vertical line 50, are steps 53–55 for "learning" network behavior. To the right of line 50, are steps 56–59 for "predicting" network behavior.

In regard to learning network behavior, the method begins at step 52 and proceeds to step 53 to read a history of network parameters from the data repository 18. The method then proceeds to step 54 to calculate/display a range of network states, and optionally identify the states as "bad," "good," "midday," etc. The method then proceeds to step 55 to construct/display a state transition graph as shown for example, in FIG. 5. The method may end at step 60, or proceed further as described below.

In regard to predicting network behavior, after completing the above steps 53–55, the method proceeds to step 56 to read current network parameters. The current network parameters are measured for a predetermined time period to determine/display the current state in step 57. Alternatively or in combination, the parameters are read for a sufficient time period to calculate/display the current trends in step 58. Then, with the results of steps 55, 57 and 58, the method may then predict/display future network states in step 59.

It should be noted that the arrows in the flow chart mean that the data produced by the box at the tail end of the arrow is required to perform the task in the box at the head of the arrow, e.g., the "predict/display future network states" box 59 requires as input the state transition graph 55, the current state 57, and the current trends 58.

Generally, it is expected that the user will execute the "learning network behavior" part of the method (to the left of dotted line 50), and later run the "predicting network behavior" (on the right side of line 50). Thus, the results of steps 54 and 55 are available for steps 57 and 59 respectively. Alternatively, the "predicting network behavior" part may be run continuously.

As part of step 59 ("predict/display future network states"), a warning signal may be generated and displayed to the user to indicate that the network is moving toward a problematic state.

Having thus described various embodiments of the present invention, additional modifications and improvements will readily occur to those skilled in the art. Accordingly, the foregoing description is by way of example only, and is not intended to be limiting.

What is claimed is:

1. A method of determining behavior patterns of a communications network from accumulated network parameters, the method including the steps of:
   a) reading accumulated network parameters representing data traffic over a multiple segment communications network with the segments connected by network couplers;
   b) determining a set of candidate states of the communications network based upon the accumulated network parameters, each said state being delineated by a learning algorithm;
   c) determining a set of candidate transitions among the set of candidate states using the network parameters; and
   d) displaying to a user, one or more of the set of candidate states and the set of candidate transitions corresponding to behavior patterns of the multiple segment communications network.

2. The method of claim 1, further including:
   measuring current network parameters for a predetermined time period;
   determining a current state of the network from the current network parameters and the set of candidate states; and
   displaying to a user the current state of the communications network.

3. The method of claim 2, further including:
   determining current trends of the network from the current network parameters and the set of candidate transitions;
   predicting a set of candidate next states that the network may enter from the set of candidate states, the set of candidate transitions, the current state, and the current trends; and
   displaying to a user at least one of the current trends and the set of candidate next states.

4. The method of claim 3, further including:
   labeling at least one of the set of candidate states, the set of candidate transitions, the current state, the set of candidate next states and the current trends according to a performance criterion.

5. The method of claim 3, further including:
   designating at least one of the set of candidate states as a problematic state; and
   warning a user when any of the set of candidate next states is a problematic state.

6. A method of determining behavior patterns of a communications network, the method including the steps of:
   a) measuring accumulated network parameters representing data traffic, over a multiple segment communications network with the segments connected by network couplers, for a first predetermined time period;
   b) storing the accumulated network parameters in a data repository;
   c) reading the accumulated network parameters from the data repository;
   d) determining a set of candidate states of the network based upon the accumulated network parameters, each said state being delineated by a learning algorithm;
   e) determining a set of candidate transitions among the set of candidate states using the network parameters; and
   f) displaying to a user, one or more of the set of candidate states and the set of candidate transitions corresponding to behavior patterns of the multiple segment communications network.

7. The method of claim 6, further including:
   measuring current network parameters for a second predetermined time period;
   determining a current state of the network from the current network parameters and the set of candidate states; and
   displaying to a user the current state of the communications network.

8. The method of claim 7, further including:
   determining current trends of the network from the current network parameters and the set of candidate transitions;
   predicting a set of candidate next states that the network may enter from the set of candidate states, the set of candidate transitions, the current state, and the current trends; and
   displaying to a user at least one of the current trends and the set of candidate next states.

9. The method of claim 8, further including:
   labeling at least one of the set of candidate states, the set of candidate transitions, the current state, the set of candidate next states, and the current trends according to a performance criterion.

10. The method of claim 9, further including:
    designating at least one of the set of candidate states as a problematic state; and
    warning a user when any of the set of candidate next states is a problematic state.

11. An apparatus that reads accumulated network parameters from a data repository of a network management system, and that provides a description of behavior patterns of a communications network, the apparatus comprising:
    a data reader, coupled to the data repository, that reads in accumulated network parameters representing data traffic over a multiple segment communications network with the segments connected by network couplers;

a behavior analyzer, coupled to the data reader, that determines a set of candidate states of the communications network based upon the accumulated network parameters and determines a set of candidate transitions between the set of candidate states using the network parameters, each said state being delineated by a learning algorithm; and a states display, coupled to the behavior analyzer, that communicates to a user the set of candidate states and the set of candidate transitions corresponding to behavior patterns of the multiple segment communications network.

12. The apparatus according to claim 11, further comprising:

a monitor, coupled to the network, that measures current network parameters for a predetermined time period;

a status analyzer, coupled to the monitor and the behavior analyzer, that determines a current state of the network from the current network parameters and the set of candidate states; and a current status display, coupled to the status analyzer, that communicates to a user the current state of the communications network.

13. The apparatus according to claim 12, further comprising:

a trends analyzer, coupled to the monitor and the behavior analyzer, that determines current trends of the network from the current network parameters and the set of candidate transitions;

a behavior predictor, coupled to the status analyzer, the trends analyzer, and the behavior analyzer, that determines a set of candidate next states that the network may enter from the set of candidate states, the set of candidate transitions, the current state, and the current trends; and a predictor display, coupled to the trends analyzer and the behavior predictor, that communicates to a user at least one of the current trends and the set of candidate next states.

14. The apparatus according to claim 13, further comprising:

a state identifier, coupled to at least one of the behavior analyzer, the status analyzer, and the behavior predictor, that labels at least one of the set of candidate states, the set of candidate transitions, the current state, the set of candidate next states and the current trends according to a performance criterion.

15. The apparatus of claim 13, further comprising:

a state identifier that designates at least one of the set of candidate states as a problematic state; and a warning unit, coupled to the state identifier, that warns a user when any of the set of candidate next states is a problematic state.

16. The method of claim 1, wherein the step of determining the set of candidate transitions includes determining the set of candidate transitions based upon the accumulated network parameters.

17. The method of claim 6, wherein the step of determining the set of candidate transitions includes determining the set of candidate transitions based upon the accumulated network parameters.

18. The apparatus of claim 11, wherein the behavior analyzer is constructed and arranged to determine the set of candidate transitions based upon the accumulated network parameters.

19. An apparatus for determining behavior patterns of a communications network from accumulated network parameters, comprising:

means for reading accumulated network parameters representing data traffic over a multiple segment communications network with the segments connected by network couplers;

means for determining a set of candidate states of the communications network based upon the accumulated network parameters, each said state being delineated by a learning algorithm;

means for determining a set of candidate transitions among the set of candidate states using the network parameters; and means for displaying to a user, one or more of the set of candidate states and the set of candidate transitions corresponding to behavior patterns of the multiple segment communications network.

20. The apparatus of claim 19, further comprising:

means for measuring current network parameters for a predetermined time period;

means for determining a current state of the network from the current network parameters and the set of candidate states; and means for displaying to a user the current state of the communications network.

21. The apparatus of claim 20, further comprising:

means for determining current trends of the network from the current network parameters and the set of candidate transitions;

means for predicting a set of candidate next states that the network may enter from the set of candidate states, the set of candidate transitions, the current state, and the current trends; and means for displaying to a user at least one of the current trends and the set of candidate next states.

22. The apparatus of claim 21, further comprising means for labeling at least one of the set of candidate states, the set of candidate transitions, the current state, the set of candidate next states and the current trends according to a performance criterion.

23. The apparatus of claim 21, further comprising:

designating at least one of the set of candidate states as a problematic state; and warning a user when any of the set of candidate next states is a problematic state.

24. The apparatus of claim 19, wherein the means for determining the set of candidate transitions includes means for determining the set of candidate transitions based upon the accumulated network parameters.

25. An apparatus for determining behavior patterns of a communications network, the apparatus comprising:

means for measuring accumulated network parameters representing data traffic, over a multiple segment communications network with the segments connected by network couplers, for a first predetermined time period;

means for storing the accumulated network parameters in a data repository;

means for reading the accumulated network parameters from the data repository;

means for determining a set of candidate states of the network based upon the accumulated network parameters, each said state being delineated by a learning algorithm;

means for determining a set of candidate transitions among the set of candidate states using the network parameters; and means for displaying to a user, one or more of the set of candidate states and the set of candidate transitions corresponding to behavior patterns of the multiple segment communications network.

26. The apparatus of claim 25, further comprising:

means for measuring current network parameters for a second predetermined time period;

means for determining a current state of the network from the current network parameters and the set of candidate states; and means for displaying to a user the current state of the communications network.

27. The apparatus of claim 26, further comprising:

means for determining current trends of the network from the current network parameters and the set of candidate transitions;

means for predicting a set of candidate next states that the network may enter from the set of candidate states, the set of candidate transitions, the current state, and the current trends; and means for displaying to a user at least one of the current trends and the set of candidate next states.

28. The apparatus of claim 27, further comprising means for labeling at least one of the set of candidate states, the set of candidate transitions, the current state, the set of candidate next states, and the current trends according to a performance criterion.

29. The apparatus of claim 28, further comprising:

means for designating at least one of the set of candidate states as a problematic state; and means for warning a user when any of the set of candidate next states is a problematic state.

30. The apparatus of claim 25, wherein the means for determining the set of candidate transitions includes means for determining the set of candidate transitions based upon the accumulated network parameters.

* * * * *